VIDEO RECORDING SYSTEM AND METHOD

Original Filed June 2, 1958 6 Sheets-Sheet 1

RAY M. DOLBY
LOUIS J. KABELL
HOWARD E. MURPHY &
HAROLD L. WALSH
INVENTORS

BY Fleher & Swain
ATTORNEYS

VIDEO RECORDING SYSTEM AND METHOD

Original Filed June 2, 1958 6 Sheets-Sheet 2

RAY M. DOLBY
LOUIS J. KABELL
HOWARD E. MURPHY &
HAROLD L. WALSH
INVENTORS

BY Flehr Hohbach Test Albritton & Herbert
ATTORNEYS

VIDEO RECORDING SYSTEM AND METHOD

Original Filed June 2, 1958 6 Sheets-Sheet 3

RAY M. DOLBY
LOUIS J. KABELL
HOWARD E. MURPHY &
HAROLD L. WALSH
INVENTORS
BY
ATTORNEYS

VIDEO RECORDING SYSTEM AND METHOD

Original Filed June 2, 1958 6 Sheets-Sheet 4

RAY M. DOLBY
LOUIS J. KABELL
HOWARD E. MURPHY &
HAROLD L. WALSH
INVENTORS

BY Fleehr Auf Swain
ATTORNEYS

VIDEO RECORDING SYSTEM AND METHOD

Original Filed June 2, 1958 6 Sheets-Sheet 5

RAY M. DOLBY
LOUIS J. KABELL
HOWARD E. MURPHY &
HAROLD L. WALSH
INVENTORS

BY Flehr Hohbach Test Albritton & Herbert
ATTORNEYS

VIDEO RECORDING SYSTEM AND METHOD

Original Filed June 2, 1958 6 Sheets-Sheet 6

RAY M. DOLBY
LOUIS J. KABELL
HOWARD E. MURPHY
HAROLD L. WALSH
INVENTORS

BY Fleht & Irwin
ATTORNEYS

United States Patent Office

Re. 26,412
Reissued June 25, 1968

26,412

VIDEO RECORDING SYSTEM AND METHOD

Ray M. Dolby, Louis J. Kabell, Howard E. Murphy, and Harold L. Walsh, by Ampex Corporation, Redwood City, Calif., a corporation of California, assignee Original No. 3,095,472, dated June 25, 1963, Ser. No. 739,051, June 2, 1958. Application for reissue May 16, 1967, Ser. No. 664,893

10 Claims. (Cl. 178—5.4)

Matter enclosed in heavy brackets [ ] appears in the original patent but forms no part of this reissue specification; matter printed in italics indicates the additions made by reissue.

*ABSTRACT OF THE DISCLOSURE*

*A video recording system is provided which includes means for reducing frequency and/or phase errors in a reproduced color video signal introduced by changes in relative speed between a transducing head and the recording medium during reproducing as compared to recording. A pilot signal is recorded upon the recording medium simultaneously with a signal which has been modulated with the composite color video signal. During reproduction, the pilot signal, which possesses similar frequency and/or phase errors to those in the chrominance signal, is separated from the modulated signal. The pilot signal is then used to cancel the frequency and/or phase errors in the chrominance signal so that the chrominance signal is substantially free of hue error.*

This invention relates generally to a video recording system and method, and more particularly to a video recording system and method suitable for recording and reproducing color video signals.

Wide band signal intelligence such as monochrome and color video signals may be recorded magnetically on magnetic tape and thereafter reproduced to form the original signal. Suitable recording systems are described in copending applications Serial No. 427,138, filed May 3, 1954, now Patent No. 2,916,546; Serial No. 506,182, filed May 5, 1955, now Patent No. 2,916,547; Serial No. 524,004, filed July 25, 1955, now Patent No. 2,956,114; Serial No. 552,868, filed December 13, 1955, now Patent No. 2,921,990; Serial No. 614,420, filed October 8, 1956, now Patent No. 2,968,682; and Serial No. 636,536, filed January 28, 1957, now Patent No. 3,005,869. In general, the systems disclosed in said patents employ a relatively wide magnetic tape together with a rotating head assembly. The head assembly includes a plurality of circumferentially spaced magnetic heads which sweep successively across the tape as it is driven lengthwise to form longitudinally spaced laterally extending recorded track portions. Margins of the tape are erased, and sound and control signals are recorded thereon. The remaining laterally extending recorded track portions are of such length that the end part of one track at one edge of the tape contains a recording which is a duplicate of the end part of the next track at the other edge of the tape.

It is relatively difficult to maintain the peripheral velocity of the recording heads constant. Any variations in peripheral velocity during recording and reproduction leads to phase and frequency variations in the reproduced signal. Phase and frequency errors may also be introduced in the reproduced signal by changes in dimension of the magnetic tape due to temperature changes, tension and the like. Further, the head assembly of a recording apparatus may wear down thereby giving a different peripheral velocity at the pick-up gaps of the various heads.

As is well known, a composite color signal includes luminance signal portions and a chrominance signal portion which is recorded as phase and amplitude modulation of a 3.58 mc, subcarrier. Any phase errors introduced in recording and reproducing is equivalent to phase modulation of the output signal and may result in introduction of hue errors in the reproduced color signal.

The color reference sub-carrier in the NTSC system is an odd multiple of one-half of the horizontal line frequency of the television signal to establish a cancelling dot interlace. Frequency and/or phase errors introduced by recording and reproducing may increase the visibility of the color sub-carrier signal in the reproduced picture.

In the past, composite color signals have been recorded by employing apparatus capable of handling only a portion of the frequency spectrum. In such systems the luminance and chrominance signals have been recorded on separate record tracks and a portion of the luminance signal has been rejected prior to recordation.

In order to record and reproduce a composite color signal, recording apparatus capable of handling a relatively broad band of frequencies is required. Apparatus of this type has been briefly described above and is described in detail in said copending applications. However, because of the nature of the composite color signal, apparatus of the above character capable of recording and reproducing the signal without introduction of hue errors and destruction of the dot interlace is relatively expensive to manufacture and difficult to adjust because of the close mechanical and electrical tolerances required.

It is an object of the present invention to provide a video recording system and method in which a continuous pilot signal is combined with a composite color signal and recorded therewith and in which the reproduced pilot signal is employed to demodulate the reproduced composite color signal to recover the chrominance signals.

It is another object of the present invention to provide a recording system and method in which a frequency modulated carrier recording of a composite color signal including a pilot signal is formed and in which the reproduced frequency modulated carrier is demodulated to recover the composite signal and the reproduced pilot signal is employed to recover the chrominance signals from the reproduced composite signal.

It is a further object of the present invention to provide a recording system and method in which a frequency modulated carrier recording having successive track portions of a composite color signal including a pilot signal is formed and in which the successive track portions are reproduced to reproduce the frequency modulated carrier and pilot signal, said frequency modulated carrier being demodulated to form the composite signal and said pilot signal being employed to recover the chrominance signals from the reproduced composite signal.

These and other objects of the invention will become more apparent from the following description when taken in conjunction with the accompanying drawing.

Referring to the drawing.

Figure 1:
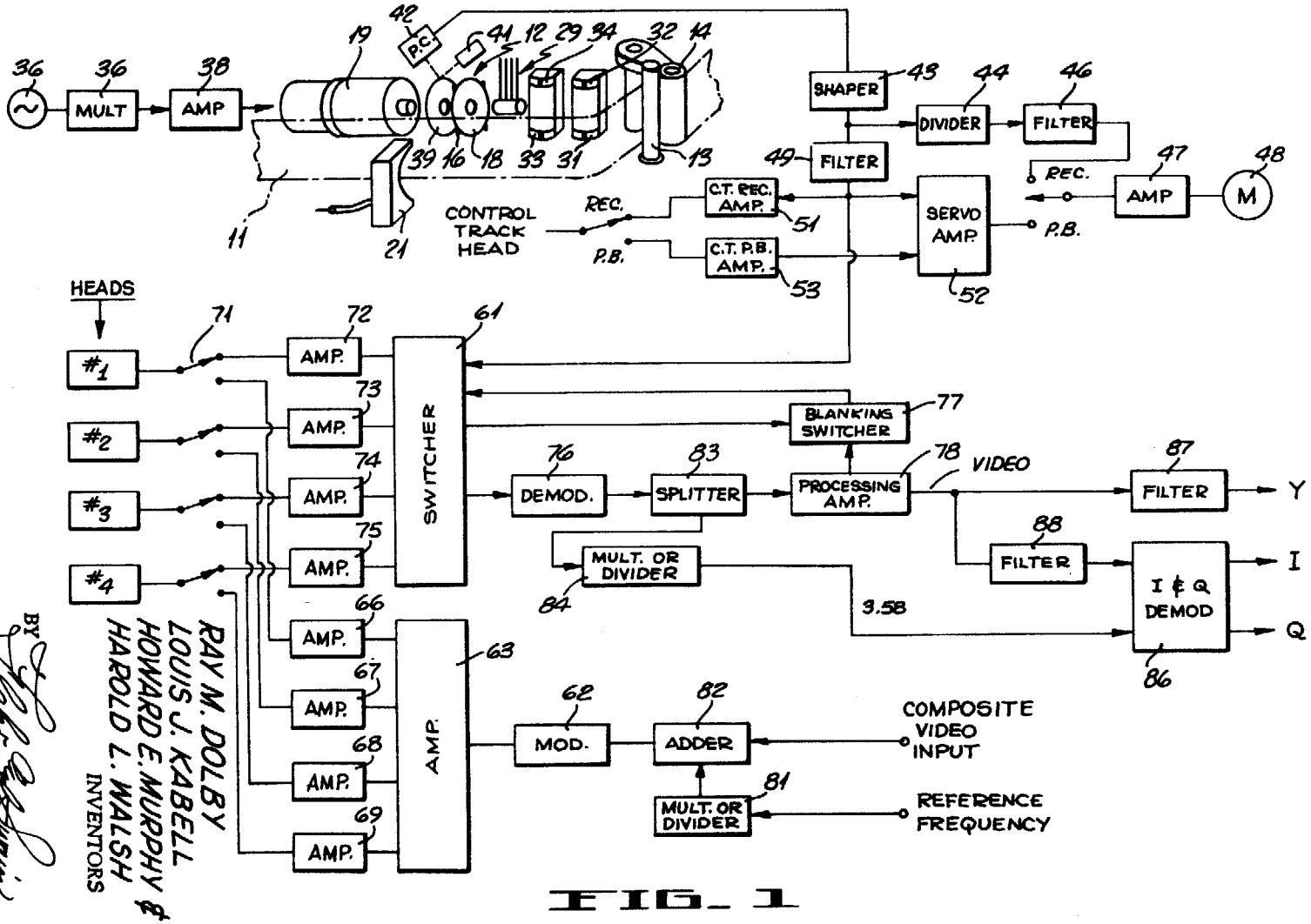
FIGURE 1 is a block diagram schematically illustrating a video recording and reproducing system in accordance with the present invention.
Figure 2:
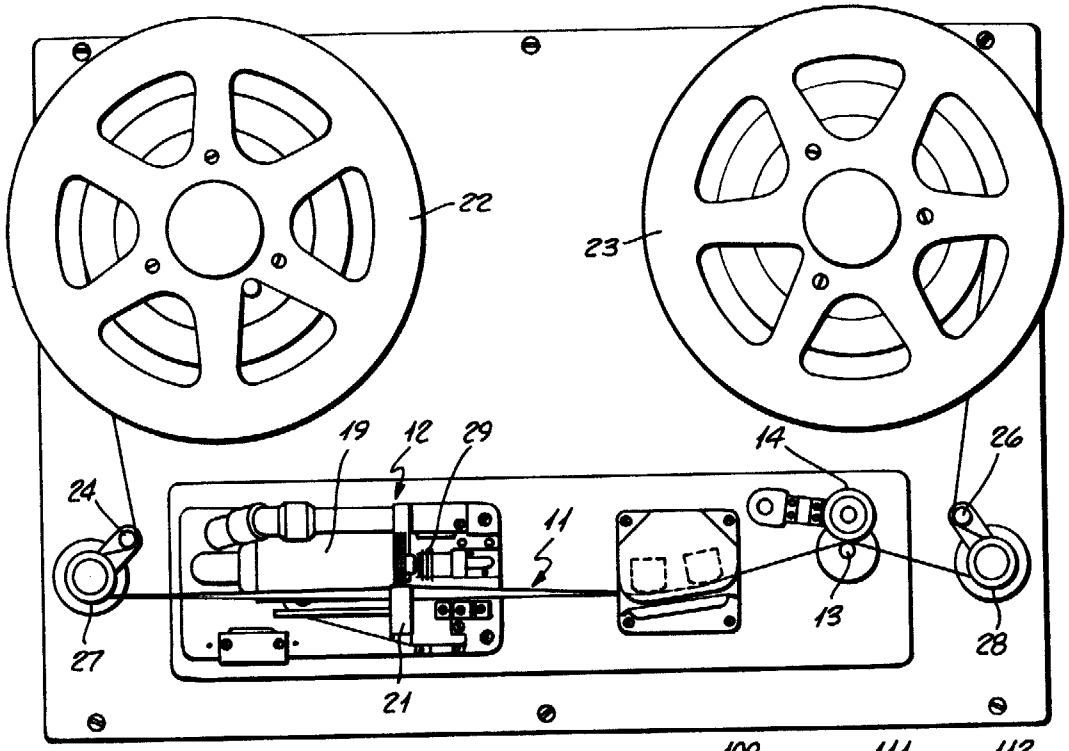
FIGURE 2 is a plan view of a suitable tape transport assembly.

Referring to FIGURES 1 and 2, the magnetic tape 11 is driven lengthwise past the transducing head assembly 12 by means of a capstan drive 13 acting in conjunction with a capstan idler 14. A plurality of transducing heads or units 16 are carried on the periphery of a disc or drum 18 which is driven by a synchronous motor 19. Suitable guide means 21 serve to cup the tape as it is drawn past the transducer units. Thus, as the transducer units sweep a circular path, the tape is in continuous pressure contact with the transducer units.

The tape 11 is supplied from a supply reel 22 and wound onto a take-up reel 23. The tape is guided past the transducing head assembly by suitable self-aligning guide posts 24 and 26 and rollers 27 and 28. The supply and take-up reels may be carried on turntables in accordance with customary practice. Suitable motors may be provided for the turntables associated with the reels in accordance with customary practice.

As previously described, one head is always in contact with the tape. The heads are connected to the electronic elements of the system by a commutator 29, schematically illustrated in FIGURES 1 and 2. The commutator may, for example, include slip rings connected to each of the heads and stationary brushes serving to make sliding contact with the associated rings.

During recording of a broad band signal, the rotational velocity of the head drum and of the capstan 13 are maintained with a specified relationship. During reproduction, the relationship of rotational velocity of the head drum 18 and capstan 13 is maintained the same as during recording within narrow limits. For this purpose, a control signal is recorded on the control track along the lower edge of the tape by a magnetic transducing device 31. The control signal is recorded as a control track during recording and during reproduction it is reproduced, amplified and used to control the relative speeds of the drum and capstan drive in a manner to be presently described. A recording head 32 serves to record the sound information on the other side margin of the magnetic tape. Sound track and control track erase heads 33 and 34 may precede the heads 31 and 32, respectively.

The electronic circuitry illustrated in block diagram of FIGURE 1 may be divided into speed control circuitry and signal circuitry. For a clear understanding of the invention, the circuits are separately described.

A frequency source 36 provides the control frequency for the apparatus during record and reproduce operations. The frequency 36 may, for example, be 60 cycle line frequency, or it may be derived from a crystal controlled oscillator as desired. Frequency of the source 36 will hereinafter be assumed to be 60 cycle line frequency. This signal frequency is applied to a multiplier 37 which serves to multiply the frequency and to provide a higher frequency signal to the amplifier 38. In the discussion that follows, it is assumed that the multiplier multiplies by 4 whereby the frequency applied to the amplifier 38 is a 240 cycle signal. The amplifier 38 is preferably a three phase power amplifier suitable for driving the three phase synchronous motor 19. As previously described, the motor 19 drives the head drum 18 which carries the transducing units or heads 16.

A revolving disc 39 coated half black and half white is also carried by the motor shaft. A suitable light source 41 is focused on the disc and reflected light is received by a photocell 42. The output of the photocell 42 is approximately a squarewave having a frequency equal to the rotational velocity of the motor 19. For the example cited, the output squarewave signal will have a frequency of 240 cycles.

The output of the photocell 42 is passed through a shaper 43 and applied to a frequency divider 44 which serves to divide down the frequency. In the instant example, the divider 44 divides by 4 to provide a 60 cycle frequency to the filter 46. The filter 46 is preferably a band pass filter which forms an output signal of substantially sinewave form. During the record operation, the output of the filter 46 is applied to an amplifier 47, and the amplified signal is employed to drive the capstan drive motor 48. Thus, the capstan motor is driven at a rotational velocity which is directly related to the rotational velocity of the head drum 18. In essence, the capstan is enslaved to the head drum. The tape moves a predetermined distance lengthwise during each complete revolution of the head drum.

The output from the shaper 43 is also applied to a filter 49, to a control track amplifier 51 which supplies a signal to the control track record head 31.

During reproduction, the control signal 36 is again applied to the multiplier 37 and amplified and fed to the synchronous motor 19. The motor drives the head drum at approximately the correct rotational velocity for the purpose of tracking the previously recorded transverse record. The photocell 42 again derives a signal which is shaped and passed through the filter 49. The signal from the filter 49 is fed to a phase comparator in the capstan servo amplifier 52. A second signal is applied to the phase comparator from the control track amplifier 53 which is connected to receive the output signal from the control track head during reproduction. The comparator produces a resultant signal having an amplitude and polarity which is a function of a phase difference between the signals from the control track and photocell. This signal is applied through a filter to the grid of a reactance tube which is one of the frequency determining elements of a conventional Wein bridge oscillator. The oscillator functions nominally at the record frequency (in the illustrative example 60 cycle). The frequency is modified up and down by the signal from the phase comparator. The output signal is fed to the amplifier 47 which drives the capstan motor and controls its rotational velocity. Thus, the capstan motor advances the tape a predetermined distance during each revolution of a head drum whereby the plurality of heads 16 accurately track the record tracks.

The effect of the system described is to cause the capstan 13 to revolve during reproduction is exactly the same relationship to the revolving drum 18, within narrow limits, as it did during the recording process. Once the drum is adjusted on the center of the track at the beginning of reproduction, the system automatically holds the relationship constant and the revolving heads indefinitely trace accurately the recorded transverse tracks. A suitable control system is described in U.S. Patent No. 2,916,547.

As previously described, the lower portion of FIGURE 1 includes the signal electronic circuitry. The only connection between the signal electronics and the control electronics is the output filter 49 which connects to the switcher 61. A signal from the filter is employed to control the switching from one play-back head to the next during reproduction to form a recombined signal corresponding to the original recorded signal.

The record electronics can consist of suitable means for producing a modulated carrier together with suitable recording amplifier. FM recording is preferred, although AM may be employed. Assuming the use of FM recording, the record electronics can include a modulator 62 which receives the input signal and a record amplifier 63 connected to receive the signal from the modulator. The output of the record amplifier 63 is continuously supplied to the individual head amplifiers 66–69. During recording, the switch 71 is positioned to connect the heads 1–4 to the amplifiers 66–69.

As described above, it is preferable to use FM recording. The type of FM recording which can be used for satisfactory recording and reproduction of video images is disclosed in U.S. Patent 2,956,114 and 2,921,990.

During reproduction, the switch 71 is connected whereby the output of each head is fed individually to its own preamplifier 72–75. The preamplifiers are connected to feed their output to the switcher 61. From the switcher, a reconstructed continuous signals is fed to a demodulator 76. The switcher serves to electronically switch to the individual outputs of the heads 1–4 as they appear at the output of the amplifiers 72–75. The switcher serves to switch sequentially as the heads sweep across the tape. The output of the amplifier is a reconstructed continuous signal which corresponds to the recorded signal. An electronic switch may be employed and may be of the type described in U.S. Patent No. 2,968,692.

It is also desirable to regulate the switching time so that it occurs during the horizontal retrace of a video signal. Timing information is supplied from a separate unit called the blanking switcher 77. The blanking switcher derives its information from the processing amplifier 78 and serves to control the timing of the switcher 61 so that the switching occurs during the backporch of the reproduced signal, whereby minimum disturbance is introduced in the reproduced signal. The switching system in U.S. Patent No. 2,968,692 describes a suitable blanking switcher.

As previously described, the output of the switcher is applied to demodulator 76 which serves to form a demodulated composite signal. The demodulated signal is preferably applied to a processing amplifier 78 which is designed to make the final output of the reproduced signal acceptable for rebroadcast or retransmission. Its main purpose is to eliminate all objectionable noise from (or in between) blanking and sync pulses; and to limit to specified peak values any noise during the picture intergal. In addition, the processing amplifier provides means for correcting the video linearity, and local or remote control of both video and sync levels. A processing amplifier suitable for performing these operations is described in detail in U.S. Patent No. 3,005,869.

As previously described, variations in head drum speed, tape dimensions and tape speed lead to frequency and phase errors in the output signal. As a result, it becomes necessary to demodulate the chrominance portion of a color video signal and then to remodulate on a sub-carrier for transmission. In accordance with the present invention, a pilot signal is recorded on the tape simultaneously with the composite color signal. During playback, the pilot signal is recovered and employed to recover the color information. The frequency and phase of the pilot signal varies in accordance with the variations described above, and in the same manner as the color signal. Thus, the pilot signal may be employed to demodulate the color information. The pilot frequency will vary in accordance with variations in the color sub-carrier frequency and thereby enable faithful demodulation of the color signal.

Referring to FIGURE 1, a stable reference frequency, which as will become presently apparent, may be derived from the color bursts of the color information, is multiplied or divided to obtain a pilot signal of such a frequency that it does not lie in the video band of frequencies. This signal is added to the video input in an adder 82. The combined signal (pilot and composite video input signals) is then employed to modulate a carrier. The modulated carrier is amplified and recorded as previously described.

The reproduced signal is applied to the switcher 61 and the reconstructed combined signal is applied to a demodulator 76. The output of the demodulator is the combined signal. This signal is applied to a splitter 83 which recovers the pilot signal and applies the same to a multiplier or divider 84 which then multiplies or divides the pilot carrier frequency to form a 3.58 mc. sub-carrier frequency. The 3.58 mc. sub-carrier is applied to the I and Q demodulator 86. The demodulated color signal is applied to a processing amplifier 78. The output of the processing amplifier is applied to a suitable filter 87 to form the Y components. The signal is also applied to a filter 88 and thence to the I and Q demodulator 86 to where the I and Q signal components of the video signal are recovered.

Thus it is seen that during recording a pilot signal is combined with the video signal and recorded simultaneously therewith to form successive tracks on the magnetic tape. When the signals are reproduced, the pilot signal is separated from the reproduced signal and operated upon to derive a 3.58 mc. local frequency for application to the I and Q demodulator 86. The local signal (derived from the pilot signal) applied to the I and Q demodulator will have frequency and phase variations which correspond to the frequency and phase variations introduced by the magnetic recording apparatus. Thus, the local signal will vary in accordance with variations in the color sub-carrier, and the I and Q demodulator will serve to faithfully recover the I and Q information. If the signal is to be retransmitted, the I and Q signals are then remodulated onto a sub-carrier and combined with the Y signal to form a composite color signal suitable for transmission purposes.

Figure 3:
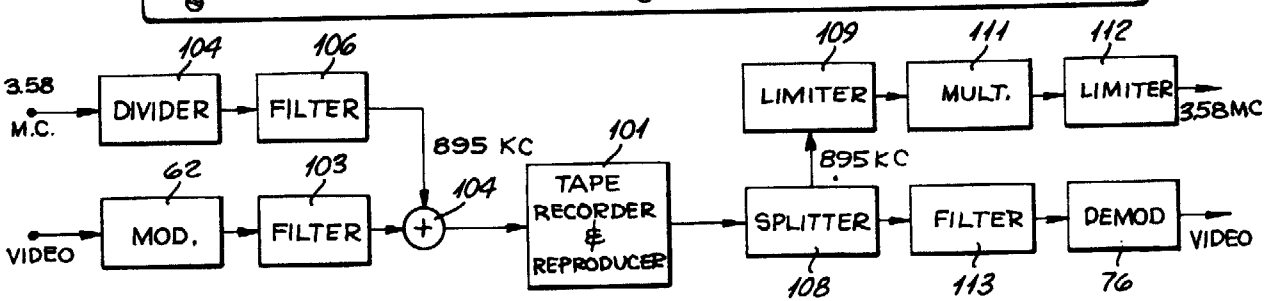
FIGURE 3 is a block diagram showing another video recording and reproducing system in accordance with the invention.

Another recording system employing pilot carriers is schematically illustrated in FIGURE 3. The block 101 represents the tape transport assembly, associated control electronics and a portion of the video electronics. The video signal intelligence is shown applied to an FM modulator 62, previously described. The output of the modulator is applied to a high pass filter 103 and thence to an adder 104. The 3.58 mc. continuous carrier which may be developed from the color bursts in the color signal in conventional manner is applied to a divider which serves to divide down the frequency and apply the same to a filter 106. This signal serves as the pilot signal. The pilot signal is applied to the adder 104 where it is added to the FM modulated carrier and applied to the record amplifier.

In one particular example, the divider 104 divided the input frequency by 4 to give an output signal frequency of 895 kc. The filter 106 was of the series parallel tuned type and with transmission zeros at 1.79 mc. and 3.58 mc. in order to eliminate harmonics of the pilot frequency which would be visible in the reproduced picture. The filter 103 was a high pass filter having a cut-off in the neighborhood of 1 mc. to thereby eliminate any interference of the color signal side bands with the recorded pilot signal. Thus, the recorded signal information was a record which contained the composite video signal intelligence together with the 895 kc. pilot signal recorded concurrently therewith.

It is, of course, apparent that other divisions might be employed, for example, by 5 or any other suitable number, or that the signal might be multiplied up, as will be presently described. However, in any one of these systems it is apparent that a pilot frequency is preferably chosen whereby it does not interfere with the color signal information and vice versa.

In the embodiment of FIGURE 3, the reproduced signal, which includes the color signal and pilot signal, is applied to a splitter 108 which serves to separate the pilot carrier and color signal. For example, the splitter might comprise a series parallel resonant trap which separates the 895 kc. signal at the switcher output. The pilot signal is applied to a limiter 109 to reduce the amplitude of switching transients. The signal is then applied to a multiplier 111 which produces 3.58 mc. signal. This signal may be subjected to limiting 112 to remove any amplitude fluctuations that would affect the output of the unbalanced color demodulators. The video signal output of the splitter may be applied to a high pass filter 113 to remove any remaining pilot signal and thence to the demodulator 76 of the type previously described. The composite color signal is then operated upon by conventional video techniques to recover the luminance and chrominance information, employing the 3.58 mc. carrier derived from the pilot signal in the color demodulators.

Figure 6:
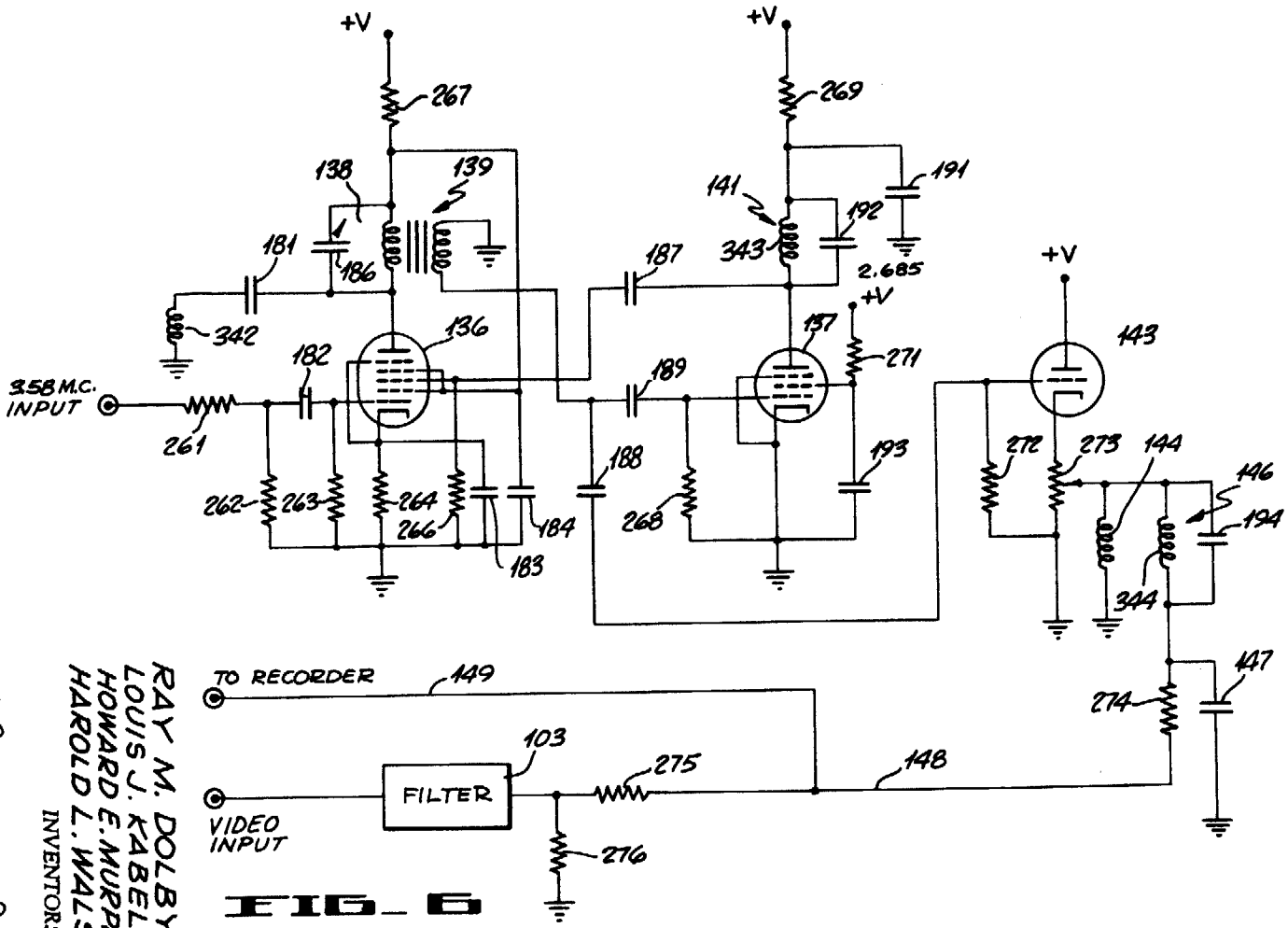
FIGURE 6 is a detailed circuit diagram of the divider and filter employed in the system of FIGURE 3.

A suitable regenerative divider is illustrated in FIGURE 6 and will be presently described in detail. A suitable frequency multiplier 111 is shown in detail in FIGURE 7A–B, and will be presently described in detail.

Figure 4:
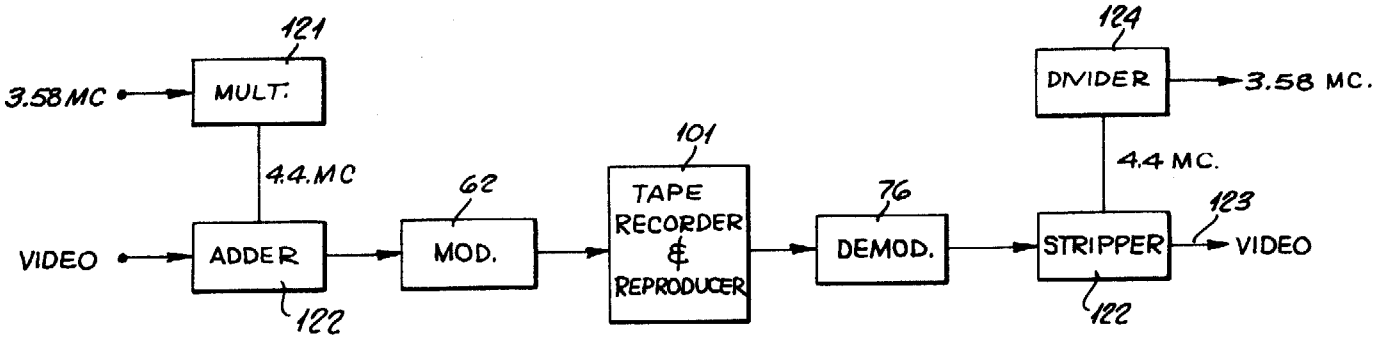
FIGURE 4 shows another video recording and reproducing system in accordance with the invention.

As previously described, it is preferable to choose a pilot signal having a frequency which lies outside the video band in order to avoid visible effects due to the pilot signal. The pilot signal should lie within the pass band of the transmission channel of the recording machine and preferably should be a simple rational multiple of the color sub-carrier frequency in order to facilitate the performance of required operations on the pilot signal. There should be no visible effects from the intermodulation product of the pilot signal and the color sub-carrier. A 4.4 mc. pilot signal is suitable in this respect. A 4.4 mc. pilot signal has a cancelling interlace beat frequency which results in the visibility of the beat (intermodulation product) being reduced to acceptable levels. Such a carrier system is shown in FIGURE 4. The 4.4 mc. signal is generated by multiplying the 3.58 color sub-carrier by $^{16}/_{13}$ in a regenerative frequency divider 121. The pilot signal is added to the color signal at the adder 122 to form a combined signal. The combined signal is then modulated [b ythe] *by the* modulator 62 and recorded as previously described. The reproduced signal is applied to the demodulator 76 and the combined signal is then operated upon by a stripper 122 to recover the color signal 123. The color signal is applied to the processing amplifier. The pilot signal is applied to a non-ambiguous divider 124 which multiplies by $^{13}/_{16}$ to form a 3.58 mc. signal. The color signal is then demodulated as previously described.

Figure 5:
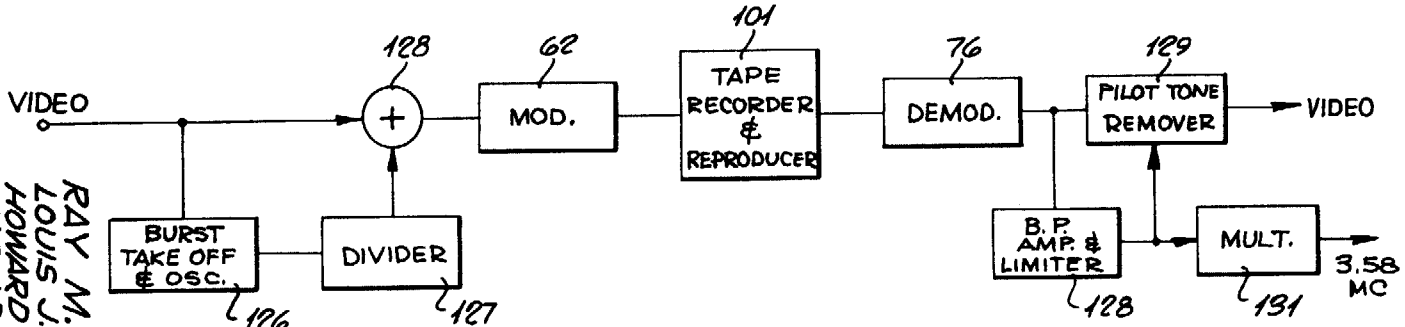
FIGURE 5 shows another video recording and reproducing system in accordance with the invention.

Referring to FIGURE 5, another system for recording and reproducing a color television signal including a pilot signal is illustrated. A burst take-off and oscillator 126 is employed to form a 3.58 mc. sub-carrier. The color sub-carrier is applied to a divider 127 and thence to an added 128. The pilot signal is handled as part of the video signal and is applied to the modulator 62 and recorded by the tape recorder 101. The signal is reproduced and demodulated by demodulator 76. The demodulated signal is applied to a band pass amplifier and then to a limiter 128 to remove amplitude modulation caused by video frequencies in the vicinity of the pilot frequency. The resulting signal is converted to a sine-wave in the pilot tone remover 129 and combined with the demodulated signal in opposite polarity with respect thereto so as to cancel out the pilot signal leaving the video signal at the output. The pilot signal is also applied to a multiplier 131 which serves to multiply the frequency up to give a 3.58 mc. color sub-carrier. As previously, described, this signal is employed to demodulate the color sub-carrier. In one particular example, the divider 127 divided by 2 gives a 1.79 megacycle signal which was then combined with the video and the signals treated as part of the video signal. The band pass amplifier was such as to pass a narrow band of frequency around 1.79 megacycle.

It is to be observed with respect to the system of FIGURE 5 that a notch filter might be employed for removing the pilot signal rather than the system described. If a notch filter is employed, the pilot tone remover may not be necessary.

Referring to FIGURE 6, a suitable divider for dividing the 3.58 signal by 4 together with output filters is illustrated. Referring to the figure, the vacuum tubes 136 and 137 and associated circuit elements form a regenerative divider. The input signal is capacitively coupled to the grid of the tube 136. A tuned circuit 138 is disposed in the plate circuit and is tuned to a frequency of 895 kc. The tuned circuit is coupled to the grid of the tube 137 by a suitable transformer 139. Thus, the tube 137 has a signal frequency of 895 kc. applied to its grid. A tuned circuit 141 is disposed in the plate circuit of the tube 137 and is tuned to the third harmonic or 2.685 mc. This circuit is connected to the third grid of the mixer tube 136. Thus, there is a mixing of the signals in the tube to form upper and lower side bands. The tuned circuit 138 is tuned to the lower side bands. The signal coupled from the tuned circuit 138 is also applied to the grid of the tube 143 which is connected as a cathode follower. The inductor 144, the tuned circuit 146 and the capacitor 147 seve to filter out any of the 1.19 mc. and 3.58 mc. frequencies as previously described. The filtered output of the cathode follower is applied to the line 148 where it is combined with the output of the filter 103 (FIGS. 3 and 6) and applied to the recorder along the line 149.

Figure 7A:
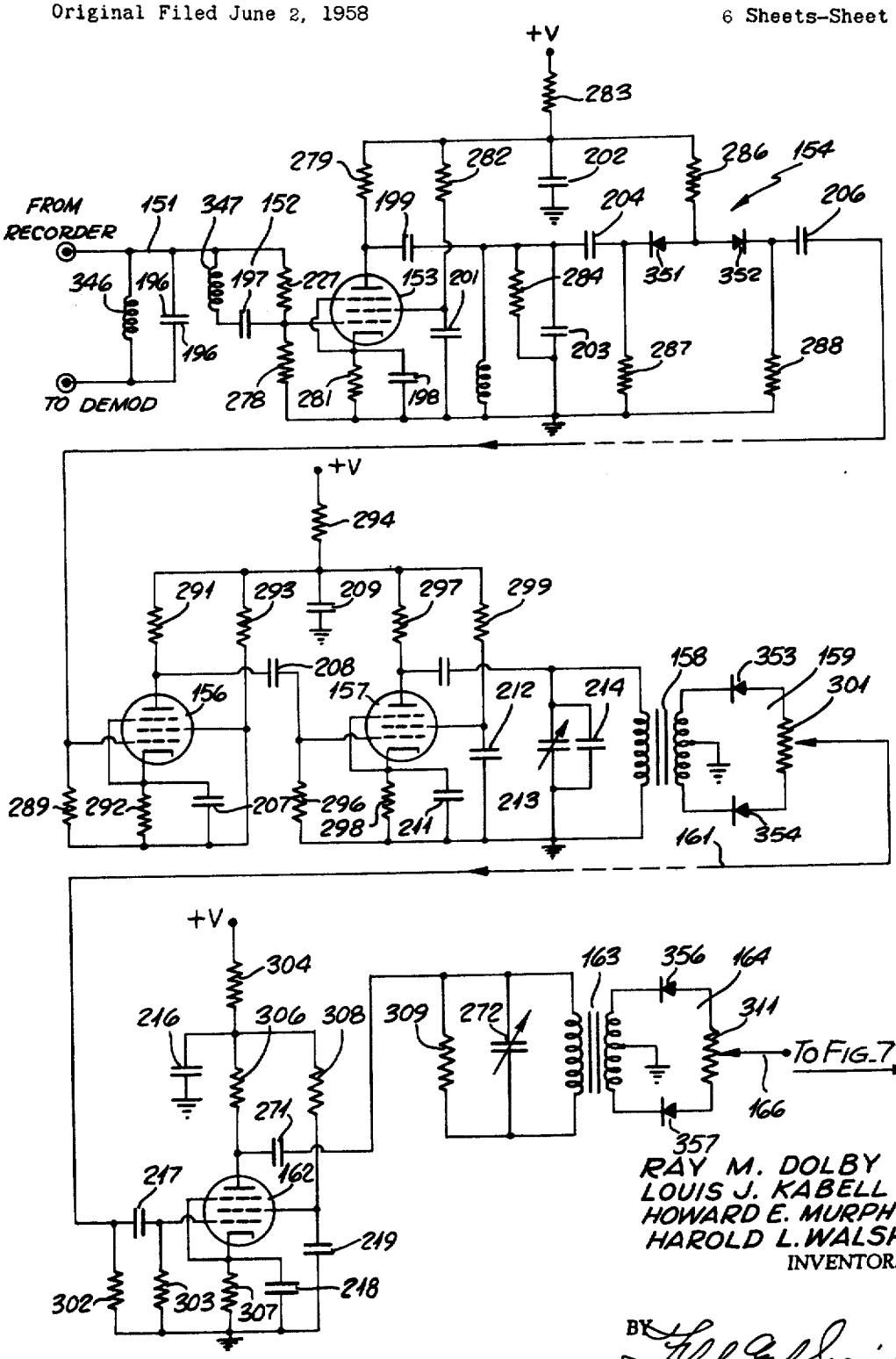
FIGURES 7A–7B are detailed circuit diagrams of the multiplier and limiter employed in the system of FIGURE 3.
Figure 7B:
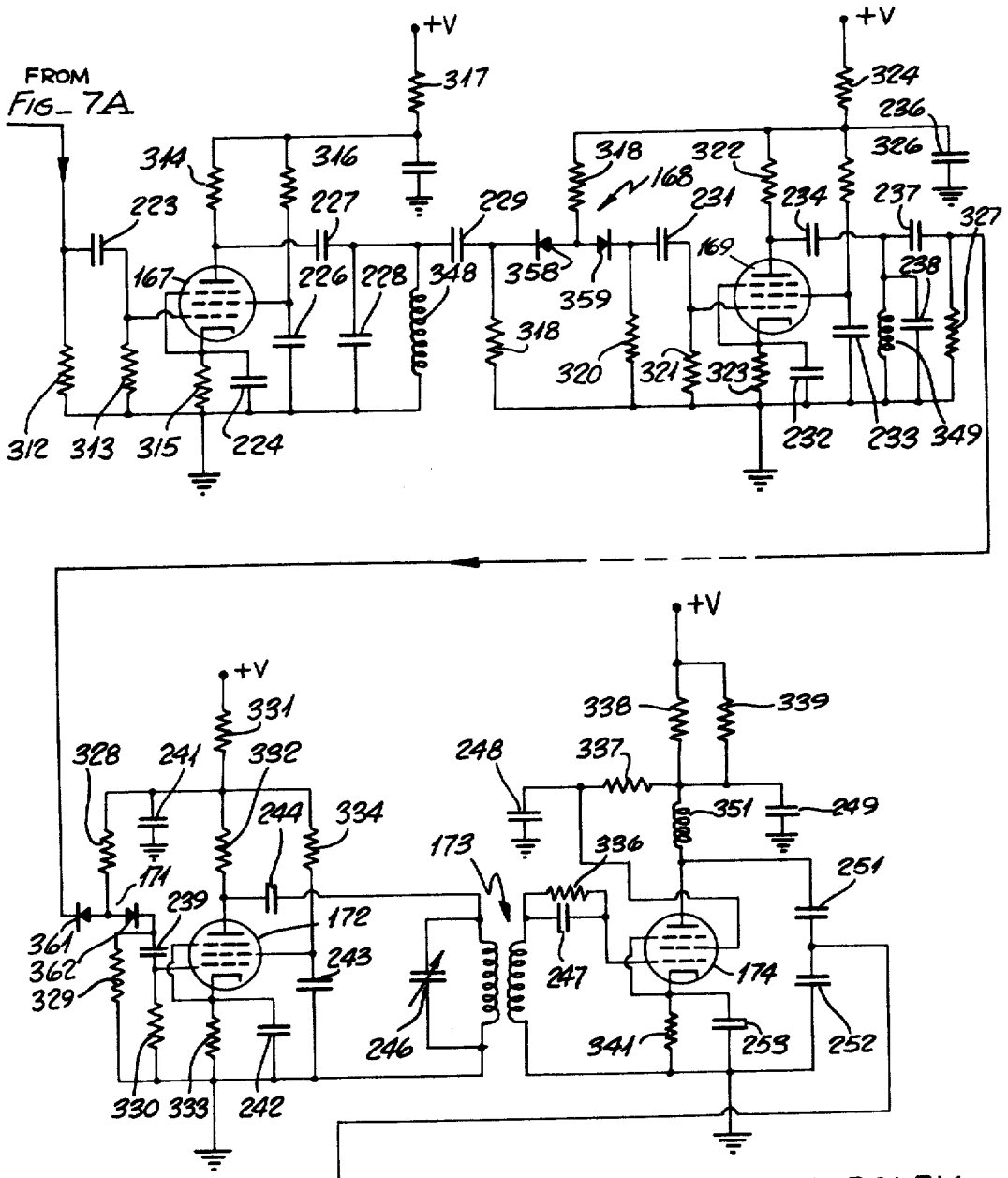

Referring to FIGURES 7A–B, a suitable frequency multiplier for a reproduce channel is illustrated. The input includes a series parallel filter network including the sections 151 and 152, respectively, which serve to separate the pilot signal from the video signal. The video signal is then applied to the demodulator as previously described and the pilot signal is applied to an amplifier stage including the tube 153. The amplified signal is applied to a pair of diodes which form a limiter 154 to reduce the amplitude of the switching transients. The output of the limiter is capacitively coupled to the tube 156 which is connected in circuit to form one stage of a two-stage amplifier with the tube 157 forming the second stage. The output of the amplifier is applied to the primary of a transformer 158 whose secondary is connected as a full wave rectifier circuit 159 which acts as a frequency doubler whereby the frequency on the line 161 is double the input frequency. The signal from the frequency doubler is applied to an amplifier stage including the tube 162 and applied to another frequency doubler which comprises a transformer 163 having its secondary connected to a full wave rectifier 164. The resultant frequency is then four times the input frequency or 3.58 mc. The output is then amplified in the amplifier including the tube 167, limited by the limiter 168, amplified by the amplifier including the tube 169, limited by the limiter 171, amplified by the tube 172, and coupled by by transformer 173 to an amplifier including the tube 174.

Apparatus was constructed in accordance with the foregoing in which the various elements in the frequency divider and multiplier had the following values, and in which the complete recording system was of the type described with respect to FIGURES 1, 2 and 3:

Voltages

+V=250 volts

Tubes

| | | | |
|---|---|---|---|
| **136** | 6BE6 | **162** | 6AU6 |
| **137** | 6AU6 | **167** | 6AU6 |
| **143** | 6C4 | **169** | 6AU6 |
| **153** | 6AG5 | **172** | 6AU6 |
| **156** | 6AG5 | **174** | 6AQ5 |
| **157** | 6AG5 | | |

Transformers

139, primary 15T, secondary 7T
158, primary 12T, secondary 12T
163, primary 8T, secondary 8T
173, primary 8T, secondary 8T Capacitors

| | | | | | |
|---|---|---|---|---|---|
| **147** | mmf | 3000 | **217** | mmf | 200 |
| **181** | mmf | 51 | **218** | mf | .01 |
| **182** | mmf | 100 | **219** | mmf | 510 |
| **183** | mmf | 510 | **221** | mf | .0047 |
| **184** | mf | .1 | **222** | mmf | 50–400 |
| **186** | mmf | 50–400 | **223** | mmf | 100 |
| **187** | mmf | 51 | **224** | mf | .0022 |
| **188** | mmf | 100 | **226** | mmf | 510 |
| **189** | mmf | 100 | **227** | mf | .0022 |
| **191** | mf | .01 | **228** | mmf | 30 |

Capacitors

| | | | | | |
|---|---|---|---|---|---|
| 192 | mmf | 100 | 229 | mmf | 510 |
| 193 | mf | .001 | 231 | mmf | 510 |
| 194 | mmf | 750 | 232 | mf | .0022 |
| 196 | mmf | 150 | 233 | mmf | 510 |
| 197 | mmf | 150 | 234 | mf | .0022 |
| 198 | mf | .01 | 236 | mf | .01 |
| 199 | mf | .01 | 237 | mmf | 510 |
| 201 | mmf | 500 | 238 | mf | 30 |
| 202 | mf | 0.1 | 239 | mmf | 510 |
| 203 | mmf | 250 | 241 | mf | .01 |
| 204 | mmf | 510 | 242 | mf | .0022 |
| 206 | mmf | 510 | 243 | mmf | 510 |
| 207 | mf | .01 | 244 | mf | .0022 |
| 208 | mf | .0047 | 246 | mmf | 50–400 |
| 209 | mf | 0.1 | 247 | mmf | 100 |
| 211 | mf | .01 | 248 | mmf | 510 |
| 212 | mmf | 510 | 249 | mf | .01 |
| 213 | mmf | 50–400 | 251 | mmf | 120 |
| 214 | mmf | 200 | 252 | mmf | 1100 |
| 216 | mf | .01 | 253 | mf | .0022 |

Resistors

| | | | | | |
|---|---|---|---|---|---|
| 261 | ohms | 1K | 303 | ohms | 100K |
| 262 | do | 2K | 304 | do | 2K |
| 263 | do | 20K | 306 | do | 13K |
| 264 | do | 75 | 307 | do | 430 |
| 266 | do | 24K | 308 | do | 68K |
| 267 | do | 20K | 309 | do | 15K |
| 268 | do | 100K | 311 | do | 1K |
| 269 | do | 12K | 312 | do | 10K |
| 271 | do | 68K | 313 | do | 100K |
| 272 | do | 100K | 314 | do | 13K |
| 273 | do | 1K | 315 | do | 400 |
| 274 | do | 680 | 316 | do | 58K |
| 275 | do | 24 | 317 | do | 2K |
| 276 | do | 300 | 318 | megohms | 2.4 |
| 277 | do | 5.1K | 319 | do | 1.2 |
| 278 | do | 75 | 320 | do | 2.4 |
| 279 | do | 15K | 321 | ohms | 10K |
| 281 | do | 260 | 322 | do | 13K |
| 282 | do | 68K | 323 | do | 430 |
| 283 | do | 2K | 324 | do | 2K |
| 284 | do | 4.7K | 326 | do | 68K |
| 286 | megohms | 72 | 327 | megohms | 2.4 |
| 287 | do | 2.4 | 328 | do | 1.2 |
| 288 | do | 2.4 | 329 | do | 2.4 |
| 289 | ohms | 10K | 330 | ohms | 10K |
| 291 | do | 15K | 331 | do | 2K |
| 292 | do | 360 | 332 | do | 13K |
| 293 | do | 68K | 333 | do | 480 |
| 294 | do | 2K | 334 | do | 68 |
| 296 | do | 12K | 336 | do | 100K |
| 297 | do | 15K | 337 | do | 80K |
| 298 | do | 360 | 338 | do | 2K |
| 299 | do | 68K | 339 | do | 2K |
| 301 | do | 1K | 341 | do | 270 |
| 302 | do | 12K | | | |

Inductors

| | | | | | |
|---|---|---|---|---|---|
| 144 | mh | 2.7 | 346 | mh | 3.4–7 |
| 342 | do | 13.0 | 347 | do | 3.4–7 |
| 343 | do | 35.0 | 348 | do | 66 |
| 344 | do | 11 | 349 | do | 66 |

Diodes

| | | | |
|---|---|---|---|
| 351 | IN68 | 357 | IN100 |
| 352 | IN68 | 358 | IN68 |
| 353 | IN100 | 359 | IN68 |
| 354 | IN100 | 361 | IN68 |
| 356 | IN100 | 362 | IN68 |

Apparatus constructed in accordance with the foregoing was operated and a video signal was successfully recorded, reproduced and the color sub-carrier demodulated to form Y, I and Q signals free of hue distortions and having suitable dot interlace.

Thus, it is seen that an improved video tape recording and reproducing system is provided. The system is capable of recording and reproducing color video signals without the introduction of distortion due to frequency and phase variations introduced by the magnetic tape recording and reproducing process.

We claim:

1. A magnetic recording system wherein a composite color video signal, including a color burst signal, is recorded on a magnetic medium and is subject to frequency and phase errors comprising:
   - means for deriving the color burst signal from the video signal during the record mode;
   - means for transforming the frequency of the burst signal to a frequency outside the band of the color video signal to be recorded, the transformed signal providing a pilot signal;
   - means for providing a carrier signal;
   - means for adding the composite video signal and the pilot signal;
   - means for modulating the carrier signal with the added signal;
   - and means for amplifying and recording the modulated signal on track portions of the magnetic medium.

2. A magnetic recording system wherein a composite color video signal, including a color burst signal, is recorded on a magnetic medium and is subject to frequency and phase errors comprising: means for deriving the color burst signal from the video signal during the record mode; [means for transforming the frequency of the burst signal to a frequency outside the band of the color video signal to be recorded, the transformed signal providing a pilot signal;] means for providing a carrier signal; means for *frequency* modulating the carrier signal with the color video signal; *means for transforming the frequency of the burst signal to a frequency below the band of the frequency modulated carrier signal to be recorded, the transformed signal providing a pilot signal;* means for adding the modulated carrier signal and the pilot signal; and means for amplifying and recording the added signal on track portions of the magnetic medium.

3. A magnetic reproducing system wherein a modulated composite color video signal and a pilot signal related to a color burst signal are to be reproduced from a recorded magnetic medium, such signals being subject to frequency and phase errors during the record mode comprising: means for deriving the recorded signal including the composite signal and the pilot signal, both having the same frequency and phase errors; means for demodulating the derived signal; means for separating the pilot signal from the demodulated video signal; means for transforming the separated pilot signal to a signal having a frequency substantially the same as that of the color burst signal; and means for applying the transformed separated pilot signal to a chrominance demodulator simultaneously with the demodulated video signal for obtaining the chrominance components of the reproduced color signal, and for correcting for the frequency and phase errors experienced during the record mode.

4. A magnetic reproducing system wherein a modulated composite color video signal having luminance and chrominance I and Q components, and a pilot signal related to a color burst signal are to be reproduced from a recorded magnetic medium, such signals being subject to frequency and phase errors during the record mode comprising: means for deriving the recorded signal including the composite signal and the pilot signal, both having the same frequency and phase errors; means for demodulating the derived signals; means for separating the pilot signal from the demodulated color video signal; means for filtering the luminance component from the demodulated signal; means for transforming the separated pilot signal to a signal having a frequency substantially the same as that of the color burst signal; and means for applying the transformed separated pilot signal to an I and Q demodulator simultaneously with the demodulated video signal for obtaining the I and Q components of the reproduced color signal, and for correcting for the frequency and phase errors experienced during the record mode.

5. A magnetic recording and reproducing system wherein a composite color video signal including a color burst signal is recorded and reproduced, and wherein such signals are recorded on a magnetic medium and are subject to frequency and phase errors comprising: means for deriving the color burst signal from the video signal during the record mode; [means for transforming the frequency of the burst signal to a frequency outside the band of the color video signal to be recorded, the transformed signal providing a pilot signal;] means for providing a carrier signal; means for *frequency* modulating the carrier signal with the color video signal; *means for transforming the frequency of the burst signal to a frequency below the band of the frequency modulated carrier signal to be recorded, the transformed signals providing a pilot signal;* means for adding the modulated signal and the pilot signal; means for amplifying and recording the added signal on single track portions of the magnetic medium; means for deriving the recorded signal having frequency and phase errors during the playback mode; *means for separating the pilot signal having the same frequency and phase errors as the recorded signal from the derived recorded signal;* means for demodulating the derived composite video signal [including the pilot signal; means for separating the pilot signal having the same frequency and phase errors as the recorded signal from the demodulated video signal]; means for transforming the separated pilot signal to a signal having a frequency substantially the same as that of the color burst signal; and means for applying the transformed separate pilot signal to a demodulator in conjunction with the demodulation video signal for demodulating the chrominance components of the reproduced signal, and for correcting for the frequency and phase errors.

*6. Apparatus in accordance with claim 2 which further includes a reproducing system comprising: means for deriving the recorded signal including the frequency modulated carrier signal and the pilot signal, both having the same frequency and phase errors; means for separating the pilot signal from the frequency modulated carrier signal; means for transforming the separated pilot signal to a signal having a frequency substantially the same as that of the color burst signal; means for demodulating the frequency modulated carrier signal, and means receiving the chrominance portion of said demodulated*

*signal and said transformed pilot signal for providing at its output the chrominance portion substantially free of hue errors caused during the record mode.*

*7. Apparatus in accordance with claim 1 which further includes a reproducing system comprising: means for deriving the recorded signal including the carrier signal modulated with the composite video signal and the pilot signal both having the same frequency and phase errors; means for demodulating the derived signal; means for separating the pilot signal from the demodulated color video signal; means for transforming the separated pilot signal to a signal having a frequency substantially the same as that of the color burst signal, and means receiving the transformed separated pilot signal and the demodulated color video signal for correcting the frequency and phase errors in the chrominance portion of the demodulated color video signal experienced during the record mode.*

*8. Apparatus in accordance with claim 1 wherein said frequency transforming means comprises a frequency multiplier providing a transformed signal of higher frequency than the burst signal.*

*9. Apparatus in accordance with claim 6 which further includes a chrominance filter for separating the chrominance portion from said demodulated video signal before introduction of the chrominance portion into said last mentioned means, and means for combining the chrominance portion at the output of said last mentioned means and the remainder of said demodulated video signal.*

*10. Apparatus in accordance with claim 5 which further includes a chrominance filter for separating the chrominance components from said demodulated video signal before introduction of the chrominance signal into said demodulator.*

References Cited

The following references, cited by the Examiner, are of record in the patented file of this patent or the original patent.

UNITED STATES PATENTS

| | | |
|---|---|---|
| 2,028,232 | 1/1936 | Miller. |
| 2,816,162 | 12/1957 | Johnson. |
| 2,823,255 | 2/1958 | Hall. |
| 2,892,017 | 6/1959 | Houghton. |
| 2,892,022 | 6/1959 | Houghton. |
| 2,909,596 | 10/1959 | Fay. |
| 2,921,976 | 1/1960 | Johnson. |
| 2,954,441 | 9/1960 | Anderson. |
| 2,960,563 | 11/1960 | Anderson. |
| 2,979,558 | 3/1961 | Leyton. |
| 3,019,291 | 1/1962 | Houghton. |

ROBERT L. GRIFFIN, *Primary Examiner.*

HOWARD W. BRITTON, *Assistant Examiner.*